(12) United States Patent
Xu

(10) Patent No.: US 10,911,304 B1
(45) Date of Patent: Feb. 2, 2021

(54) CLIENT-SERVER TRANSACTION PROTOCOL FOR COMPATIBILITY VERIFICATION

(71) Applicant: Cisco Technology, Inc., San Jose, CA (US)

(72) Inventor: Ya Xu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/575,175

(22) Filed: Sep. 18, 2019

(51) Int. Cl.
  *H04L 12/24* (2006.01)
  *H04L 29/12* (2006.01)
  *G06F 8/65* (2018.01)
  *G06F 9/4401* (2018.01)

(52) U.S. Cl.
  CPC .............. *H04L 41/082* (2013.01); *G06F 8/65* (2013.01); *G06F 9/4401* (2013.01); *H04L 41/0823* (2013.01); *H04L 41/0869* (2013.01); *H04L 41/0886* (2013.01); *H04L 61/2015* (2013.01)

(58) Field of Classification Search
None
See application file for complete search history.

(56) References Cited

U.S. PATENT DOCUMENTS

| | | | | |
|---|---|---|---|---|
| 8,387,112 | B1 * | 2/2013 | Ranjan | G06F 21/57 717/168 |
| 2004/0003266 | A1 * | 1/2004 | Moshir | H04L 63/0236 713/191 |
| 2005/0149924 | A1 * | 7/2005 | Komarla | G06F 21/575 717/176 |
| 2007/0058792 | A1 * | 3/2007 | Chaudhari | H04L 65/1006 379/88.17 |
| 2008/0134165 | A1 * | 6/2008 | Anderson | H04N 21/4586 717/173 |
| 2009/0198805 | A1 * | 8/2009 | Ben-Shaul | G06F 9/4416 709/222 |

(Continued)

OTHER PUBLICATIONS

"IBM BladeCenter Products and Technology." Published Jul. 2011. Retrieved on Jun. 22, 2020 from <https://shop.bechtle.nl/medias/0iY9lcXcwEhF98n9CBYV58-30.pdf> (Year: 2011).*

*Primary Examiner* — Scott B Christensen
(74) *Attorney, Agent, or Firm* — Lee & Hayes, P.C.

(57) ABSTRACT

This disclosure describes techniques for verifying compatibility of NOS image versions during startup of one or more hardware modules of a distributed router system. A client-server transaction protocol is executed between a communication server and a communication client configured according to the protocol to run on hardware modules of a distributed router system. A communication client discovers a communication server through a handshake transaction and sends a software image signature of an NOS image version. The communication server forwards the software image signature to an NOS verification server to determine whether the software image signature is compatible. Further, the communication server instructs the communication client to cause the hardware module hosting the communication client to boot either from a network interface or from local storage, at least in part on the determination of compatibility by the verification server, reducing numbers of reboots and increasing uptime and throughput of the system.

20 Claims, 5 Drawing Sheets

(56) References Cited

U.S. PATENT DOCUMENTS

| | | | |
|---|---|---|---|
| 2011/0087872 A1* | 4/2011 | Shah | G06F 21/554 |
| | | | 713/2 |
| 2011/0320800 A1* | 12/2011 | Azam | G06F 9/4416 |
| | | | 713/2 |
| 2012/0005321 A1* | 1/2012 | Hu | H04L 61/2015 |
| | | | 709/222 |
| 2014/0075467 A1* | 3/2014 | Chritudass | H04N 21/4882 |
| | | | 725/25 |
| 2015/0095515 A1* | 4/2015 | Krithivas | H04L 41/00 |
| | | | 709/245 |
| 2017/0242420 A1* | 8/2017 | Mugnier | G08C 17/02 |

* cited by examiner

CLIENT-SERVER TRANSACTION PROTOCOL FOR COMPATIBILITY VERIFICATION

TECHNICAL FIELD

The present disclosure relates generally to providing network operating system (NOS) upgrades for a distributed router system by verifying compatibility using a software image signature.

BACKGROUND

To achieve performance at scale, network equipment such as routers may be provided as logical functions distributed over multiple physical chassis. One or more physical routers making up a distributed router may each be a physical computing system having modular hardware elements.

Performance and throughput of a distributed router may be determined by the choice of hardware modules, and number of hardware modules installed in each physical chassis. Logically, the router processing resources and forwarding resources of the physical chassis may be treated as a single router device, due to interconnection of each module's network interfaces through one or more common fabric planes established by fabric cards. Router processor modules may perform supervision functions over hardware modules, such as remotely booting modules over a network by implementation of the PXE protocol.

To maintain performance and throughput, maximizing uptime to the hardware modules of running on a distributed router system is a desirable objective, and thus it is desirable to minimize operations that would interrupt the uptime, such as booting.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
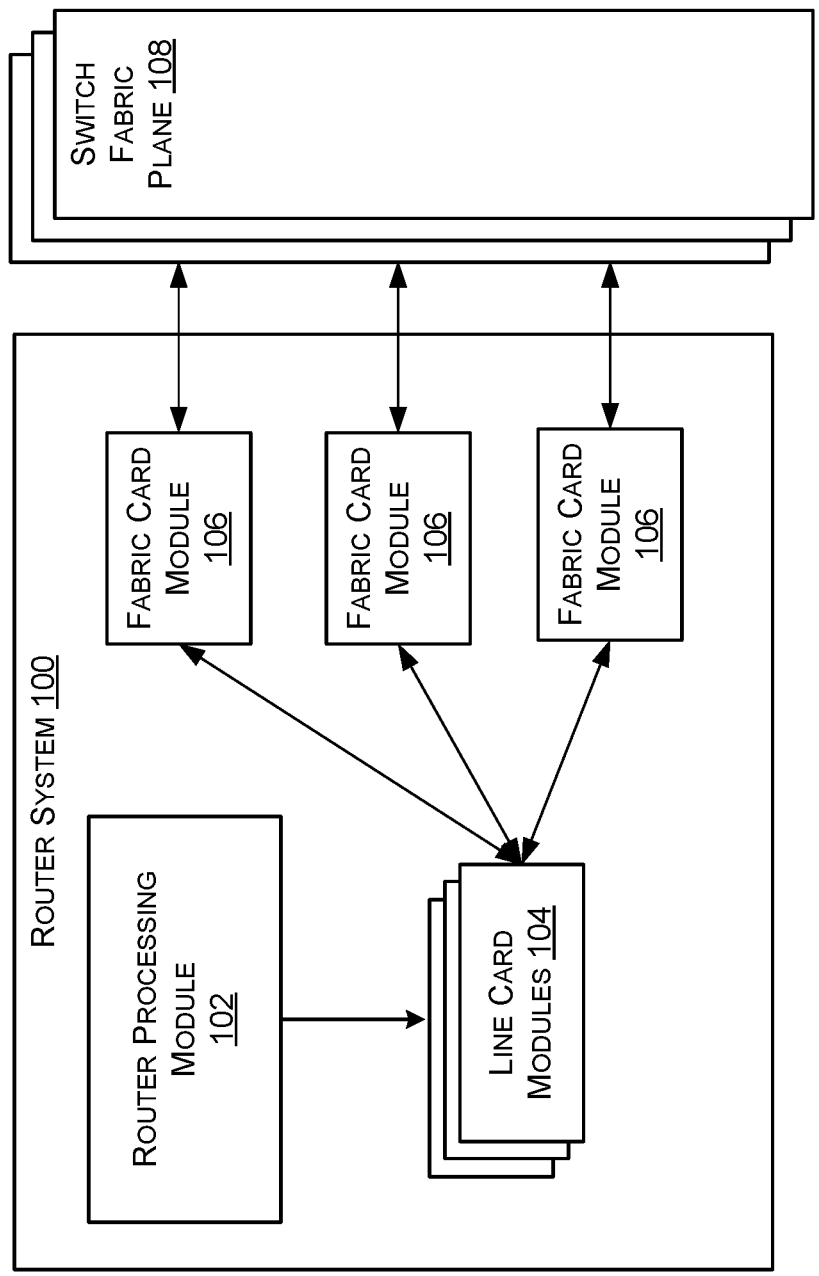
FIG. 1 illustrates a system-architecture diagram of an example distributed router system in which a software image signature store of a node provides an RP module of the distributed router system with information regarding an NOS image version running on the node.

This disclosure describes techniques for verifying compatibility of NOS image versions during startup of one or more hardware modules of a distributed router system.

IP data routing in general involves delivering data packets through one or more networks, such as personal area networks (PANs), wired and wireless local area networks (LANs), wired and wireless wide area networks (WANs), the Internet, and so forth. A router in general may receive packets forwarded over one or more networks from other systems, determine a next hop, route, and/or destination to forward the packets to, and forward the packets to a system determined by the next hop, route, and/or destination. The next hop, route, and/or destination in the one or more networks may be determined by any or any combination of static routing tables and various dynamic routing algorithms.

The described techniques may be implemented in one or more transaction protocols which establish communications between a client and a server.

The method includes executing a client-server transaction protocol between one or more communication servers and one or more communication clients configured according to the protocol to run on hardware modules of a distributed router system. The method further includes a communication client discovering a communication server through a handshake transaction and sending a software image signature of an NOS image version flashed onto a hardware module hosting the communication client to the communication server. The communication server forwards the software image signature to an NOS verification server to determine whether the software image signature is compatible. Further, the method includes the communication server instructing the communication client to cause the hardware module hosting the communication client to boot either from a network interface or from local storage, by instructions supported by the client-server transaction protocol based at least in part on the determination of compatibility by the verification server.

Additionally, the techniques described herein may be performed by a system and/or device having non-transitory computer-readable media storing computer-executable instructions that, when executed by one or more processors, performs the method described above.

Example Embodiments

A router of a distributed router system may be a computing system having one or more of multiple types of hardware modules (or nodes) installed, including a router processor (RP) module. In addition to the RP module, the router may include one or more modular services cards (MSCs) which may be installed in various combinations to provide routing functionality and throughput. Computational functions of each router of the distributed router system may be governed by one or more software images flashed onto storage of the nodes, such as a Basic Input/Output System (BIOS) and a network operating system (NOS).

An RP module may be a controller for the nodes of the router. The RP module may include one or more hardware processors configured to execute one or more stored instruction. The processor(s) may comprise one or more cores. Further, the RP module may include one or more network interfaces configured to provide communications between the RP module and nodes of one or more routers of the distributed router system, including LC modules. The network interfaces may include devices configured to communicate with systems on personal area networks (PANs), wired and wireless local area networks (LANs), wired and wireless wide area networks (WANs), and so forth. For example, the network interfaces may include devices compatible with Ethernet, Wi-Fi™, and so forth.

The RP module may include computer-readable media, including volatile storage such as memory, and non-volatile memory such as disk storage, that stores one or more operating systems. The operating system(s) may generally support processing functions of the RP module, such as computing packet routing according to one or more routing algorithms, modifying forwarding tables, distributing packets to the LC modules, and so forth.

MSCs installed at a router may include one or more line card (LC) modules. An LC module may be a hardware module which performs packet forwarding based on routing tables. The LC module may include one or more hardware processors configured to execute one or more stored instructions. Further, the LC module may include one or more network interfaces configured to provide communications between the LC module and other nodes on a network, and between the LC module and RP modules. The network interfaces may include devices configured to communicate with nodes of the distributed router system and with other network entities on personal area networks (PANs), wired and wireless local area networks (LANs), wired and wireless wide area networks (WANs), and so forth. For example, the network interfaces may include devices compatible with Ethernet, Wi-Fi™, and so forth, and may include devices implementing network communication protocols such as Preboot eXecution Environment (PXE) and Dynamic Host Configuration Protocol (DHCP).

The LC module may include computer-readable media, including volatile storage such as memory, and non-volatile memory such as disk storage, that stores one or more operating systems. The operating system(s) may generally support processing functions of the RP module, such as receiving inbound packets from a network, receiving outbound packets from an RP module, forwarding an outbound packet based on information in a forwarding table, and so forth.

A router may include one or more fabric card (FC) modules. FC modules of a distributed router system form one or more switch fabric planes 108 which provide interconnections between RPs and MSCs of the distributed router system. An inbound packet into the distributed router system may be received at an RP or an MSC, and, upon being processed for routing by an RP, may be forwarded through the one or more switch fabric planes 108 to an MSC for outbound forwarding.

Since outbound forwarding functionality is provided by LC modules of one or more routers of the distributed router system, availability and throughput of packet forwarding in the distributed router system is at least determined by a number of LC modules that is available (online) at a given time. Therefore, it is desirable to maximize the uptime of as many LC modules as possible in the distributed router system to maximize router availability and throughput.

A service provider of a distributed router system for a user may provide to the user, as a service, software upgrades to the NOS installed for the router system. However, operating system upgrades require BIOS reboots, reducing node uptime. Consequently, by conventional methods, users may need to manually reschedule NOS upgrades at low-traffic times to avoid degradation to routing throughput and unavailability of routing services. Such manual rescheduling of upgrades may be inconvenient, or may be prone to human error, and may still be subject to unexpected surges of network traffic.

An NOS upgrade may include bug fixes, elimination of security vulnerabilities, addition of features, or other elements which may be considered critical, thus compelling installation of the upgrade over uptime considerations. For example, critical features introduced in an NOS upgrade may be required to provide ongoing services to a deployment, where lack of those features may prevent the provision of such services. Therefore, it may be advantageous to balance node uptime and downtime, so that nodes are kept online unless downtime is made necessary by, for example, critical features in an upgrade.

Thus, when an upgrade to an NOS becomes available, the NOS upgrade may not need to be installed for a given node. By postponement or skipping of a software upgrade, uptime of nodes may be prolonged and downtime avoided.

A software image signature may be any information which identifies features of any version of a software image such as an NOS image, and is comparable to a software image signature of any other version thereof, to determine differences therebetween. For example, a software image signature may encode information regarding various features of a first version of a software image, such as whether the features are present or absent, such that the software image signature may be compared to a software image signature of a second version of the software image to determine that a feature present in the first version is not present in the second version, or a feature present in the second version is not present in the first version. For example, a software image signature may be a text string including a series of bits, where a position of a bit or positions of multiple bits may indicate a particular feature, and the value of the bit, or a value of or the values of the multiple bits, may indicate the presence or absence of the feature.

A particular feature indicated by software image signatures may match across software image signatures of any number of different software image versions, and may match regardless of whether any other feature matches across those software image signatures.

A software image signature may be data in an NOS image stored on a non-volatile storage of an LC module. Alternatively, a software image signature may be generated from an NOS image.

Based on feature information contained in a software image signature, compatibility of the version of the NOS may be determined. A service provider may define compatibility in accordance with priorities and judgments regarding the significance of feature differences between NOS versions to normal operation of the distributed router system. In some examples, an NOS image version being compatible may indicate the presence of a particular feature in the NOS image version, the behavior of a particular feature in the NOS image version being a particular behavior or not being a particular behavior, the removal of a particular bug or security vulnerability in the NOS image version, the removal of a particular feature or behavior in the NOS image version, and any other states of particular features which give rise to differences between NOS versions which may be prioritized or judged as significant to normal operation of the distributed router system.

Features which determine compatibility may need to be in accordance with the state of those features in a particular determining NOS image version flashed onto a particular physical system of the distributed router system 100, such as a particular physical system which hosts an NOS verification server (as defined below). If states of compatibility-determining features of an arbitrary NOS image version are in accordance with the states of those same respective features of the determining NOS image version, then the arbitrary NOS image version may be compatible even if states of other, non-compatibility-determining features of the arbitrary NOS image version are not in accordance with states of those same respective features of the determining NOS image version.

This disclosure describes techniques for client-server communication between a node of a distributed router system with a server to verify compatibility of an NOS version running on the node. The described techniques may be implemented in one or more client-server transaction protocols which establish communications between a client and a server. In some examples, a client-server transaction protocol may be a DHCP protocol established between any number of nodes of a distributed router system, as clients, and a DHCP server, as the server.

In some examples, a distributed router system may implement DHCP communication between RP modules and LC modules, in order to implement the PXE protocol to install, deploy, and boot NOS images on LCs. According to implementations of the PXE protocol, the RP may implement a PXE server operative to communicate with other nodes of the distributed router system, established as PXE clients, which are operative to initiate a DHCP session with the PXE server. The result of the RP and one or more nodes negotiating this DHCP session establishes the RP as a PXE server (and therefore a DHCP server) and the nodes as PXE clients (and therefore DHCP clients). Each node may identify the RP as a PXE server through broadcasting a discovery message according to the PXE protocol, whereupon the RP may reply to the discovery message to identify the RP as a PXE server, whereupon the node may engage in further DHCP communications according to the PXE protocol.

The PXE protocol enables the RP, as a PXE server, to send an NOS image to each node over a network, and initiate software booting of the NOS image on each of those nodes. Furthermore, the PXE protocol enables the RP to instruct the node over a network connection to perform various management functions. For example, the RP may instruct the node to reboot in PXE boot mode and enter a boot sequence from the network interface, instead of a BIOS boot sequence from local storage. After rebooting, a PXE boot mode may cause the node to download an NOS image over the network connection to the RP and boot from the downloaded NOS image. The RP may check the NOS image version during a PXE boot sequence of the node in order to determine compatibility of the NOS image. Also, the RP may, having determined that the NOS image running on a node is not compatible, force the node to reboot again to install a compatible NOS image on the node by the PXE protocol. Additionally, the RP may force a node to reboot again upon installing a compatible NOS image on the node to cause the node to run the compatible NOS image.

Thus, nodes of a distributed router system incur significant downtime as a result of the NOS image upgrade process as described above. Moreover, three forced reboots take place, resulting in not only downtime but repeated interruption to router service, which may lead to errors or unpredictable behavior. While a user may configure an RP to schedule reboots for NOS image upgrades, scheduling may be inconvenient, or may be prone to human error, and may still be subject to unexpected surges of network traffic. Therefore, the techniques described herein provide the RP with information regarding which NOS image version is running on a node of the distributed router system, and whether the NOS image version is compatible in accordance with service provider definitions, by making this information readable from a software image signature as an alternative to performing a version check during a node boot sequence. In this way, the RP may determine that the NOS image version running on the node needs to be upgrade or does not need to be upgraded to meet vendor-defined compatibility requirements without forcing a node reboot solely for version check purposes, therefore reducing the amount of downtime and number of interruptions to service required to perform node upgrades.

The techniques herein are described with reference to the DHCP protocol as specified in RFC 2131, and those techniques herein which expand or extend the DHCP protocol may be implemented in RFC 2132. However, although the techniques described herein are primarily with reference to the PXE protocol as implemented through DHCP, the techniques are generally applicable to any protocol for booting software images on a computing system through a network interface, and any client-server transaction protocol.

The techniques described herein provide various improvements and efficiencies with respect to distributed router systems. For example, the techniques described herein may reduce the amount of downtime and interruptions, for nodes of the distributed router system to process packet forwarding services.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example router system 100 in which a software image signature store of a node provides an RP module of the distributed router system with information regarding an NOS image version running on the node.

In some examples, computing resources of the router system 100 include RP modules 102 and LC modules 104. An RP module 102 may provide computing functions to the router system 100 such as computing packet routing according to one or more routing algorithms, modifying forwarding tables, distributing packets to LC modules 104, and so forth. An LC module 104 may provide computing functions to the router system 100 such as receiving inbound packets from a network, receiving outbound packets from an RP module 102, forwarding an outbound packet based on information in a forwarding table, and so forth.

The router system 100 may include a physical chassis having an RP module 102, one or more LC modules 104, and one or more FC modules 106. The router system 100 may be part of a networked collection of router systems wherein the workload of logical routing functions is distributed across individual physical router systems. Inbound IP packets may arrive at an entry point of the distributed router system over a network, and may be forwarded by the distributed router system outbound over the network to another destination. Inbound IP packets for routing may be received at LC modules 104 or RP modules 102, and RP modules 102 may compute a next hop destination of the inbound IP packets according to one or more static routing tables and/or dynamic routing algorithms. RP modules 102 may further update a forwarding table stored on one more storages of the RP module 102 based on information in a header of an inbound IP packet according to one or more dynamic routing algorithms. RP modules 102 may further distribute an inbound IP packet to a node of the distributed router system to be forwarded to a next hop destination as determined by the RP modules 102.

RP modules 102 and LC modules 104 of the router system 100 may be mutually connected over one or more switch fabric planes 108 established over a network by FC modules 106 of the router system 100. An inbound packet into the router system 100 may be received at an RP module 102 or a LC module 104, and, upon being processed for routing by an RP module 102, may be forwarded through the one or more switch fabric planes 108 to a LC module 104 for outbound forwarding.

Availability of routing services of a distributed router system may be determined by a number of LC modules 104 which are online at any given time. The number of online LC modules 104 may further determine throughput of routing services, as fewer online LC modules 104 will be able to forward fewer packets concurrently. Generally, RP modules 102 of a distributed router system form a control plane which provides control and management functions over computing resources (e.g., LC modules 104), networking, storage, etc. of the router system, to direct provision of routing services and detection and correction of errors, with or without direct active management by users.

For example, RP modules 102 may detect online insertion and deletion (OIR) of nodes of a router system 100—i.e., hot swapping of physical LC modules 104, FC modules 106, and other nodes of the router system 100. Upon detecting online insertion of a node, the RP module 102 may, by PXE protocols, boot an NOS image loaded onto the node. In some examples, the RP module 102 may check the version of an NOS image loaded onto the node by techniques as described herein, and may then, by PXE protocols, load another NOS image version onto the node.

In some examples, the distributed router system may be managed and maintained by a service provider such that users do not have to invest in and maintain the computing infrastructure for their routing service needs. Generally, a user may be provided access to, or allocated use of, computing resources embodied by a number of physical chassis in the distributed router system. The distributed router system may scale, such as by adding physical chassis or adding LC modules 104 to a physical chassis, based on demand for the individual users. Through a terminal in communication with network interfaces of the control plane, users may access the control plane of the distributed router system to configure and manage the distributed router system. However, the distributed router system need not be managed by a service provider, and can be managed by any entity, including the users themselves.

The techniques described herein include generating and storing a software image signature which identifies features of a flashed NOS image version and is comparable to a software image signature of any other NOS image version thereof, to determine differences therebetween. A software image signature of an NOS image version may be pre-generated alongside an NOS image. A software image signature of an NOS image version may be generated during flashing of an NOS image onto storage of a node. A software image signature may be stored alongside a flashed NOS image on storage or may be stored independently from the NOS image, such that the software image signature may be read without booting the NOS image and without the NOS image being booted. A software image signature may be stored in a non-volatile storage of the LC module 104 where it may be trusted to be free from alteration or tampering, since information contained in the software image signature should be reliable upon reading without further checks. For example, a software image signature may be stored in a physical security module installed in a physical chassis, operative to store trusted data such as keys and certificates. To this end, the stored software image signature may further be encrypted to provide security.

Figure 2:
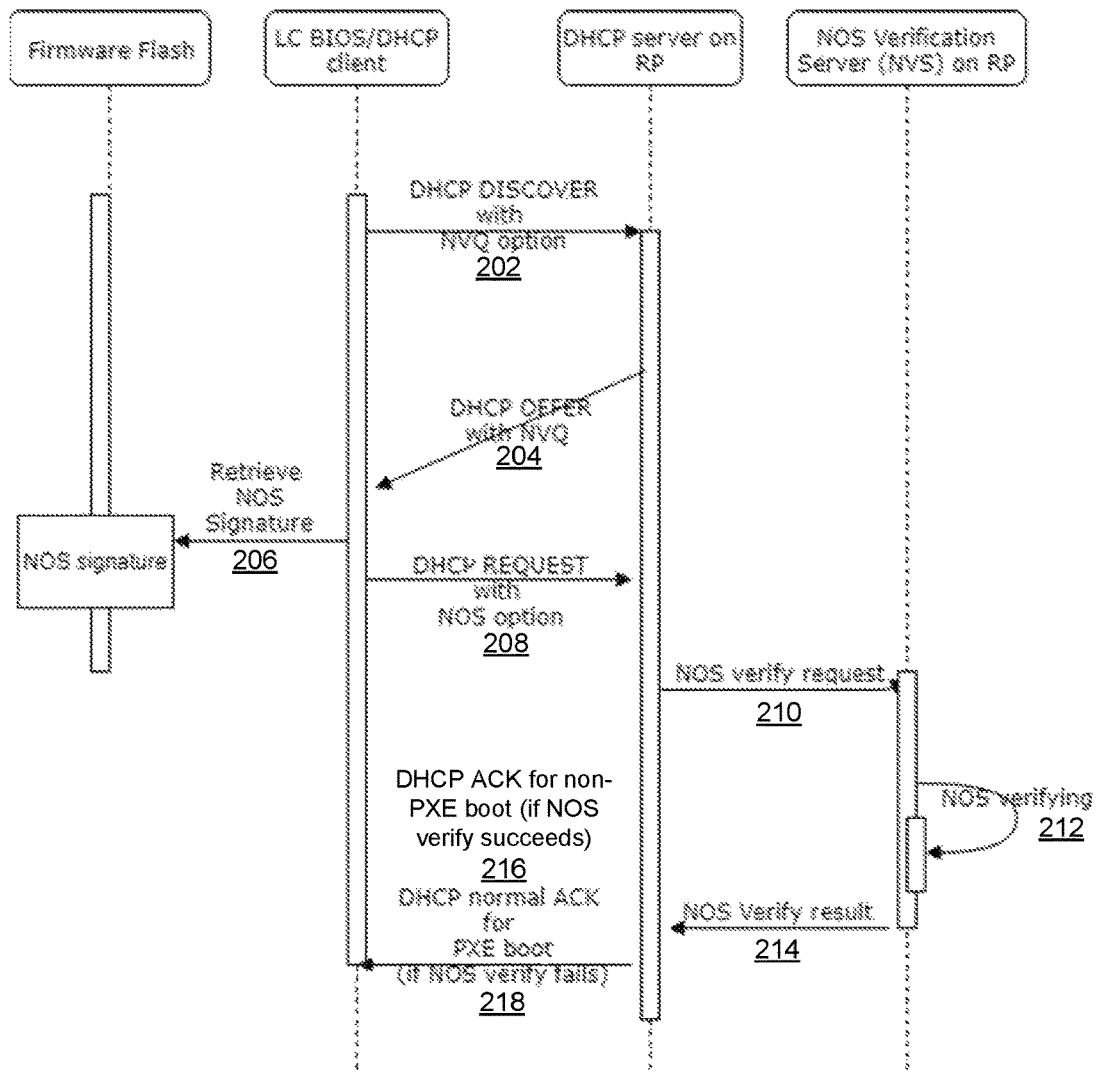
FIG. 2 illustrates a swim lane diagram of a client-server transaction method according to some examples of client-server protocols of this disclosure.

An RP module 102 may be configured as a PXE server such that the RP module 102 is operative to communicate with LC modules 104 by the DHCP protocol to configure each LC module 104 as a PXE client. The DHCP protocol implemented on PXE servers and PXE clients according to some examples may be extended to support transactions to read a software image signature and verify compatibility of an NOS image version identified by a software image signature. FIG. 2 illustrates a swim lane diagram of a client-server transaction method 200 according to some examples of client-server protocols of this disclosure such as extended DHCP protocols as described above.

As illustrated, a software image signature of an NOS image version may be stored on storage of a LC module 104 while the NOS image version is flashed to the LC module 104. An RP module 102 may be configured as a communication server according to a client-server protocol, such as a PXE server, and the LC module 104 may be configured as a communication client according to a client-server protocol, such as a PXE client. The RP module 102, being a PXE server, is also a DHCP server and the LC module 104, being a PXE client, is also a DHCP client. Any number of RP modules 102 of the distributed router system may act as communication servers in this manner. Any number of LC modules 104 of the distributed router system may act as communication clients in this manner.

An RP module 102 may furthermore, according to client-server protocols of this disclosure, be configured as an NOS verification server and the LC module 104 may furthermore, according to client-server protocols of this disclosure, be configured as an NOS verification client. Any number, but not all, RP modules 102 of a distributed router system may be configured as NOS verification servers. The RP module 102 and the LC module 104 may be configured to perform client-server transactions as described below, initiated by the LC module 104, for example, during a boot sequence of the LC module 104 at the BIOS level. Therefore, the BIOS of the LC module may act as a communication client.

In a step 202 of the client-server transaction method 200, an LC module 104 configured as an NOS verifier client may send a discovery message to discover an NOS verifier server. Although the LC module 104 may be established as an NOS verifier client by an RP module 102 established as an NOS verifier server, due to the distributed architecture of the LC modules 104 and the RP modules 102, multiple RP modules 102 may perform control functions of each RP module 102 interchangeably, while not all RP modules 102 are established as NOS verifier servers. Therefore, an LC module 104 may not be able to identify or establish communications with an NOS verifier server directly.

Instead, the LC module 104 may broadcast a discovery message over the network, which may be received by any number of RP modules 102 configured as communication servers to initiate the client-server transaction method 200 with each respective communication server to determine whether each respective RP module 102 is established as an NOS verifier server. The discovery message may be, for example, a DHCPDISCOVER message as specified by the DHCP protocol which may identify the LC module 104 as a client by, for example, its IP address. The discovery message may be extended to include an NOS verifier query (abbreviated herein to NVQ) and the NVQ may identify the LC module 104 as an NOS verifier client.

A communication server enabled as an NOS verifier server may then receive a discovery message. According to client-server protocols of the present disclosure, the server may read the discovery message, identify the originating communication client and identify the originating communication client as an NOS verifier client.

At a step 204 of the client-server transaction method 200, the communication server returns an offer message to the LC module 104 as the originating communication client. The offer message may be, for example, a DHCPOFFER message as specified by the DHCP protocol which may identify the communication server by, for example, its IP address. The offer message may be extended to include an NVQ, which may, for example, be the same as the NVQ included in the discovery message.

The communication client may then receive one or more offer messages. One or more offer messages may originate from one or more respective communication servers of the distributed router system. According to client-server protocols of the present disclosure, the communication client may read the one or more offer messages, identify each originating communication server, and select an offer message from among the one or more offer messages. In some examples, RP modules 102 of the distributed router system may be active RP modules or standby RP modules. In some examples, a selected offer message may be one originating from a communication server of an active RP module 102 of the distributed router system. In some examples, a selected offer message may be one originating from a communication server of a standby RP module 102 of the distributed router system.

At a step 206 of the client-server transaction method 200, the communication client retrieves a software image signature. The software image signature may be retrieved from a non-volatile storage of the LC module 104 hosting the communication client alongside a flashed NOS image on storage or independently from the NOS image, such that the software image signature may be read without booting the NOS image and without the NOS image being booted. A software image signature may be retrieved from a storage where it may be trusted to be free from alteration or tampering.

At a step 208 of the client-server transaction method 200, the communication client sends a request message to a selected communication server from which the selected offer message originated. The request message may be, for example, a DHCPREQUEST message as specified by the DHCP protocol which may identify the communication server by, for example, its IP address. The request message may be extended to include the software image signature retrieved from the storage.

The selected communication server may receive the request message. According to client-server protocols of the present disclosure, the selected communication server may read the request message, identify the communication client that the request message originates from, and extract the software image signature from the request message.

At a step 210 of the client-server transaction method 200, the selected communication server may forward the software image signature to an NOS verification server. The NOS verification server may be an application running on any RP module 102 of the distributed router system. The NOS verification server may be running on the same RP module 102 as the selected communication server. The NOS verification server may be running on a different RP module 102 as the selected communication server, in which case the selected communication server may forward the software image signature to the NOS verification server by a network connection over the respective network interfaces of each RP module 102.

The NOS verification server may receive the software image signature.

At a step 212 of the client-server transaction method 200, the NOS verification server verifies compatibility of an NOS image version represented by the software image signature. Compatibility may be predetermined by a service provider as states of compatibility-determining features of the NOS image version represented by the software image signature being in accordance with the states of those same respective features of a determining NOS version. A determining NOS version may be, for example, an NOS image version flashed onto storage of the RP module 102 hosting the NOS verification server, or may be an NOS image version otherwise stored on storage of the RP module 102 hosting the NOS verification server. A determining software image signature may further be stored on the RP module 102 hosting the NOS verification server.

The NOS verification server may compare states of compatibility-determining features of the NOS image version to the states of those same respective features of the determining NOS version. In some examples, the NOS verification server may determine the presence of a particular feature in the NOS image version, the behavior of a particular feature in the NOS image version being a particular behavior or not being a particular behavior, the removal of a particular bug or security vulnerability in the NOS image version, the removal of a particular feature or behavior in the NOS image version, and any other states of particular features which give rise to differences between NOS versions which may be prioritized or judged as significant to normal operation of the distributed router system.

If the NOS verification server determines that the states of compatibility-determining features of the NOS image version represented by the software image signature are in accordance with the states of those same respective features of the determining NOS image version, then the NOS verification server may determine the NOS image version represented by the software image signature as compatible even if states of other, non-compatibility-determining features of the arbitrary NOS image version are not in accordance with states of those same respective features of the determining NOS image version. The NOS verification server may not need to determine states of non-compatibility-determining features.

Upon determining that the NOS image version represented by the software image signature is compatible or is not compatible, the NOS verification server may create an NOS compatibility verification result.

At a step 214 of the client-server transaction method, the NOS verification server forwards the NOS compatibility verification result to the selected communication server.

The selected communication server may determine whether the NOS compatibility verification result indicates that the NOS image version represented by the software image signature is compatible or is not compatible.

At a step 216 of the client-server transaction method, upon the selected communication server determining that the NOS compatibility verification result indicates compatibility, the selected communication server sends an acknowledgement message instructing to boot locally to the communication client. The acknowledgement message may be, for example, an ACK message as defined by the PXE protocol. The acknowledgement message instructing to boot locally may be configured with an option which notifies the LC module 104 hosting the communication client to continue the startup process by booting from an NOS image flashed onto local non-volatile storage, rather than boot from a network interface.

At a step 218 of the client-server transaction method, as an alternative to step 216, upon the selected communication server determining that the NOS compatibility verification result indicates incompatibility, the selected communication server sends an acknowledgement message instructing to boot by PXE and an NOS image to the communication client. The acknowledgement message may be, for example, an ACK message as defined by the PXE protocol. The acknowledgment message instructing to boot by PXE may be configured with an option which notifies the LC module 104 hosting the communication client to continue the startup process by booting from an NOS image receive over a network interface.

Subsequently, the client-server transaction method may conclude and the LC module 104 hosting the communication client may continue the startup process in accordance with the outcome of the client-server transaction method. Consequently, the communication server does not need to instruct the communication client to reboot the LC module 104 hosting the communication client in a separate iteration in order to verify compatibility, increasing uptime and throughput of the LC module 104 and the distributed router system overall.

Figure 3:
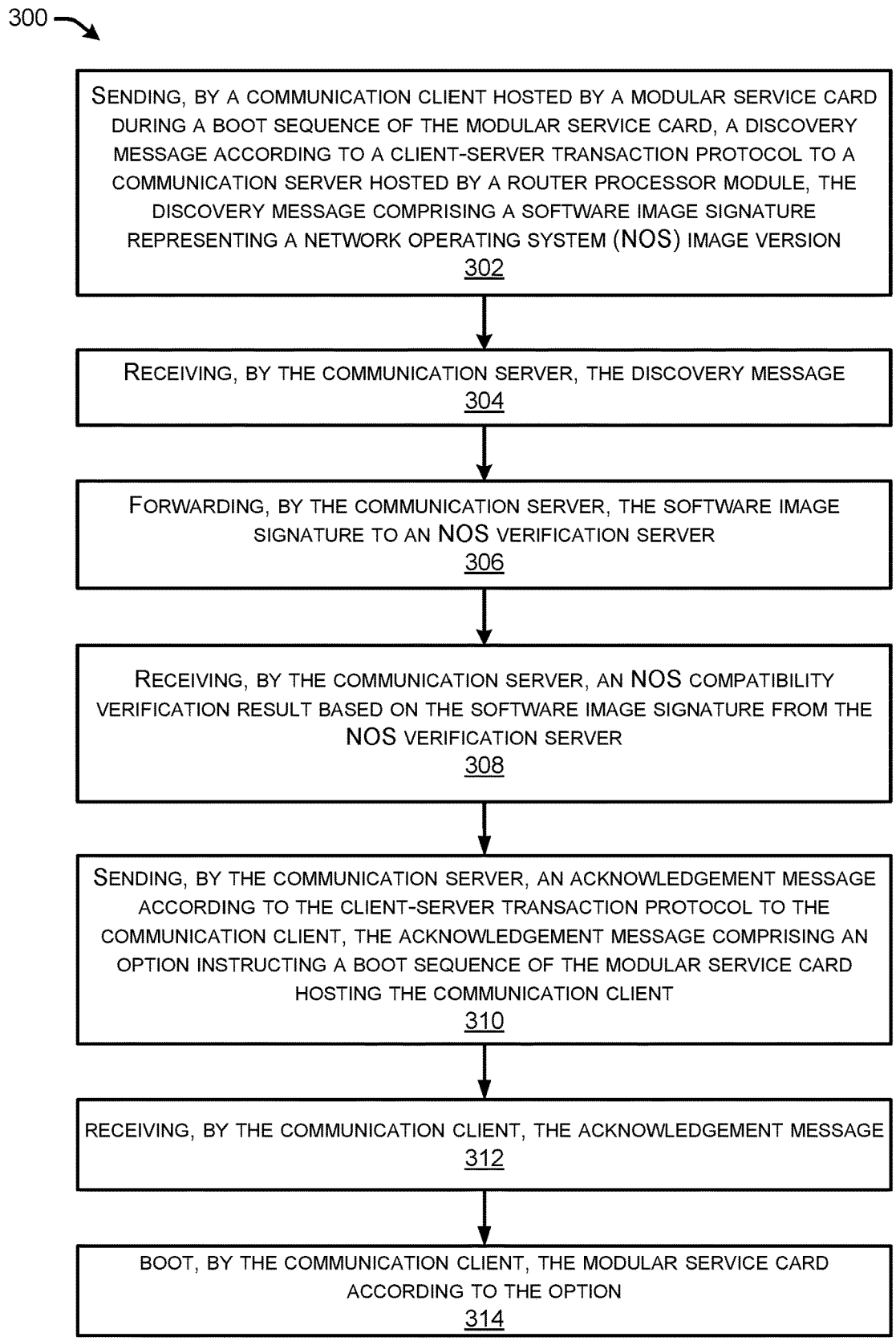
FIG. 3 illustrates a flow diagram of a client-server transaction method to support transactions to read a software image signature and verify compatibility of an NOS image version identified by a software image signature.

FIG. 3 illustrates a flow diagram of a client-server transaction method 300 to support transactions to read a software image signature and verify compatibility of an NOS image version identified by a software image signature. In some examples, the method 300 may be performed, at least in part, by a communication client and a communication server as described above, each hosted on a hardware module that comprises one or more processors and one or more non-transitory computer-readable media storing computer-executable instructions that, when executed by the one or more processors, cause the one or more processors to perform the steps of method 300.

At 302, the communication client hosted by a modular service card sends, during a boot sequence of the modular service card, a discovery message according to a client-server transaction protocol to a communication server hosted by a router processor module, the discovery message comprising a software image signature representing a network operating system (NOS) image version.

At 304, the communication server receives the discovery message.

At 306, the communication server forwards the software image signature to an NOS verification server.

At 308, the communication server receives an NOS compatibility verification result based on the software image signature from the NOS verification server.

At 310, the communication server sends an acknowledgement message according to the client-server transaction protocol to the communication client, the acknowledgement message comprising an option instructing a boot sequence of the modular service card hosting the communication client.

At 312, the communication client receives the acknowledgement message.

At 314, the communication client boots the modular service card according to the option.

In examples, the router processor module and the modular service card are in communication over one or more switch fabric planes established by a plurality of fabric card modules.

In examples, the client-server transaction protocol is DHCP, and the option instructing a boot sequence is specified by PXE protocol.

In examples, the NOS verification server may be hosted on the router processor module, or the NOS verification server may be hosted on a second router processor module, and the router processor module and the second router processor module are in communication over one or more switch fabric planes established by a plurality of fabric card modules.

In examples, in the case that the NOS compatibility verification result indicates that the NOS image version represented by the NOS signature is compatible, the option of the acknowledgement message instructs the boot sequence of the modular service card to boot from an NOS image on local storage of the modular service card. The communication client then boots the modular service card from an NOS image on local storage of the modular service card.

In examples, in the case that the NOS compatibility verification result indicates that the NOS image version represented by the NOS signature is compatible, the option of the acknowledgement message instructs the boot sequence of the modular service card to boot from an NOS image on local storage of the modular service card. The communication client then boots the modular service card from an NOS image file received over a network interface of the modular service card from the communication server.

Figure 4:
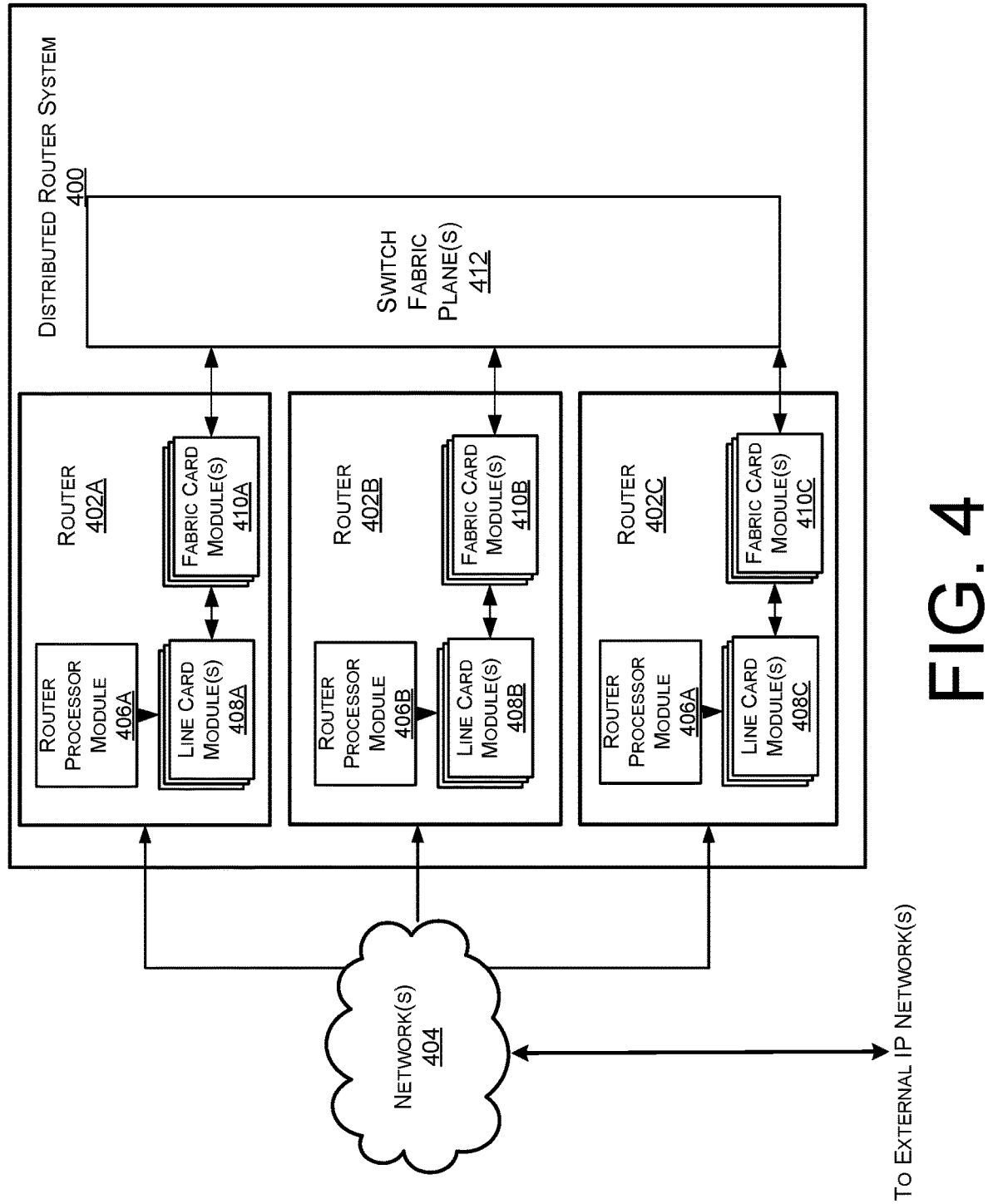
FIG. 4 is a computing system diagram illustrating a configuration for a distributed router system that can be utilized to implement aspects of the technologies disclosed herein.

FIG. 4 is a computing system diagram illustrating a configuration for a distributed router system 400 that can be utilized to implement aspects of the technologies disclosed herein. The example distributed router system 400 shown in FIG. 4 includes several routers 402A-402C (which might be referred to herein singularly as "a router 402" or in the plural as "the routers 402") for providing routing processing, forwarding, and fabric resources. In some examples, the routers 402 may include, or correspond to, a physical router chassis 500 described below.

The routers 402 may be rack-mount hardware chassis configured appropriately for installing and expanding the routing processing, forwarding, and fabric resources described herein. As mentioned above, the routing processing, forwarding, and fabric resources provided by the distributed router system 400 can be data processing resources such as hardware modules having one or more processors, memory, data storage resources, network interfaces, and others. Some of the routers 402 can also be configured to execute a supervisor capable of booting and managing the routing processing and forwarding resources. In the case of VM instances, for example, the supervisor can be server application configured to conduct client-server communications with hardware modules on any number of routers 402 through network interfaces.

In the example distributed router system 400 shown in FIG. 3, one or more appropriate networks 404 is utilized to interconnect the routers 402A-402C. It should be appreciated that any number of computing systems, software components, networks, and networking devices can be utilized to interconnect the components of the distributed router system 400 by utilizing the fabric resources of the distributed router system 400 to establish a fabric plane over the one or more networks. Appropriate load balancing devices or software or other types of network infrastructure components can also be utilized for balancing a load between each of the routers 402A-402C in the distributed router system 400, and between router processing and forwarding resources among the routers 402. It should be appreciated that the configuration of the distributed router system 400 described with reference to FIG. 4 is merely illustrative and that other implementations can be utilized.

In some instances, the distributed router system 400 may provide router processing, forwarding, and fabric plane resources, embodied by, for example, RP modules 406A-406C, LC modules 408A-408C, and fabric card modules 410A-410C, on an as-needed basis to incoming network traffic such as IP traffic. Among other types of functionality, the router processing, forwarding, and fabric plane resources provided by the distributed router system 400 may be utilized to implement the various services described above.

Router processing, forwarding, and fabric plane resources provided by the distributed router system 400 can be distributed in a number of physical configurations, while the logical organization of the functionality of the distributed router system 400 remains independent of physical configurations. By channeling inter-router traffic through the fabric plane 412, the RP modules 406A-406C can be configured to utilize LC modules 408A-408C to perform packet forwarding regardless of the physical location of the RP modules 406A-406C and the LC modules 408A-408C with regard to each other. Router processing and forwarding resources may be configured to logically operate as a single device distributed over any number of physical chassis.

The router processing, forwarding, and fabric plane resources provided by the distributed router system 400 may be enabled in one embodiment by one or more physical chassis. The physical chassis are assemblies utilized to house and operate hardware modules and associated components. The physical chassis typically include redundant and backup power, communications, and cooling systems. The physical chassis can also be located in geographically disparate locations. One illustrative embodiment for a physical router chassis 500 that can be utilized to implement the technologies disclosed herein will be described below with regard to FIG. 5.

Figure 5:
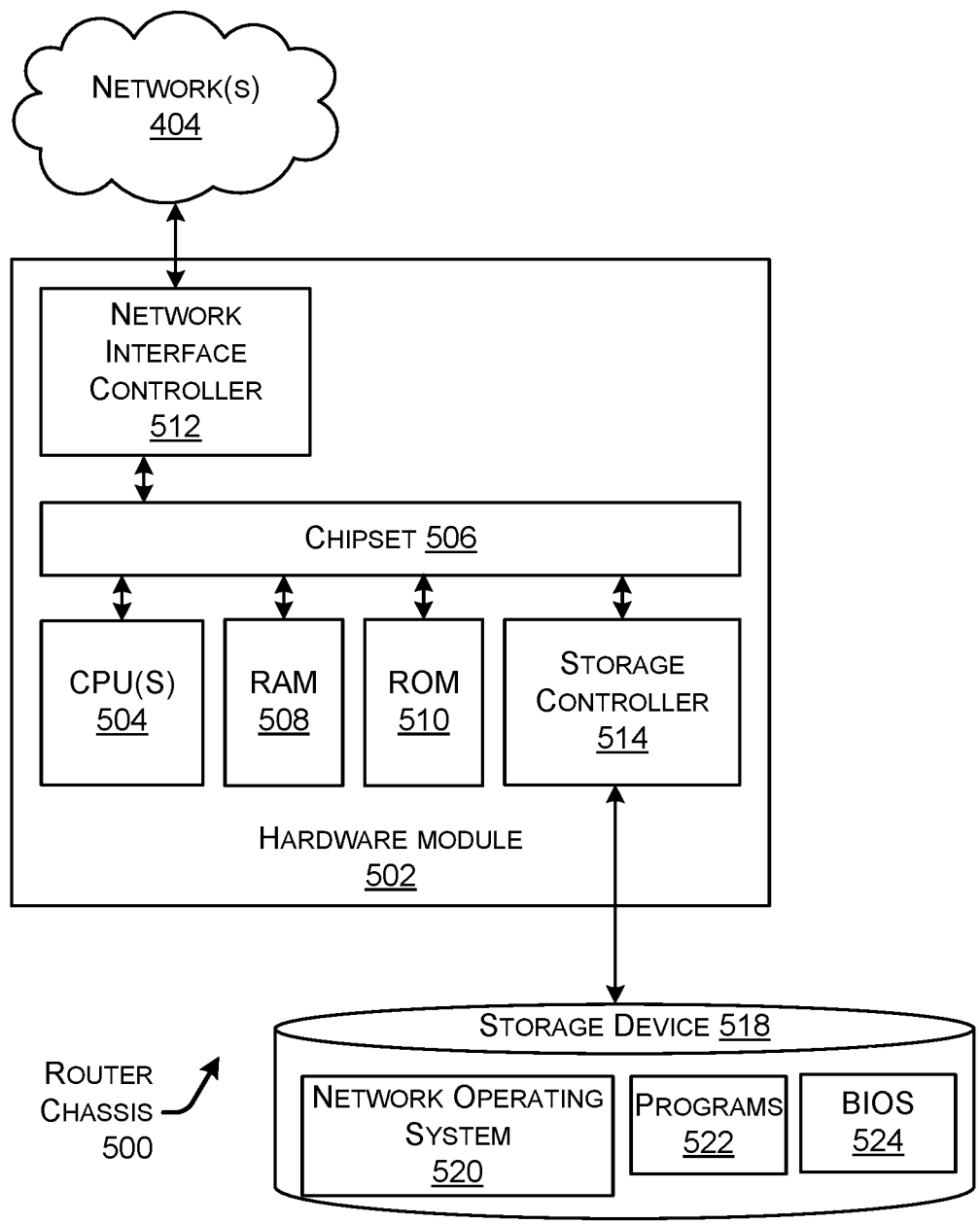
FIG. 5 is a computer architecture diagram showing an illustrative physical chassis capable of supporting hardware modules that can be utilized to implement aspects of the various technologies presented herein.

FIG. 5 shows an example computer architecture for a router chassis 500 capable of supporting hardware modules for implementing the functionality described above. The computer architecture shown in FIG. 5 illustrates a computing device assembled from modular components, and can be utilized to execute any of the software components presented herein. The router chassis 500 may, in some examples, correspond to a router 402 described above.

One or more hardware modules 502 installed in a physical chassis 500 may be a physical card or module to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the hardware module 502.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the hardware module 502. The chipset 506 can provide an interface to a RAM 508, used as the main memory in the hardware module 502. The chipset 506 can further provide an interface to a computer-readable storage medium such as a read-only memory ("ROM") 510 or non-volatile RAM ("NVRAM") for storing basic routines that help to startup the hardware module 502 and to transfer information between the various components and devices. The ROM 510 or NVRAM can also store other software components necessary for the operation of the hardware module 502 in accordance with the configurations described herein.

The hardware module 502 can operate in a networked environment using logical connections to remote computing devices and computer systems through a network, such as the network 508. The chipset 506 can include functionality for providing network connectivity through a NIC 512, such as a gigabit Ethernet adapter. The NIC 512 is capable of connecting the hardware module 502 to other computing devices over the network 508. It should be appreciated that multiple NICs 512 can be present in the hardware module 502, connecting the computer to other types of networks and remote computer systems.

The hardware module 502 can be connected to a storage device 518 that provides non-volatile storage for the hardware module 502. The storage device 518 can store an operating system 520, programs 522, a BIOS 524, and data, which have been described in greater detail herein. The storage device 518 can be connected to the hardware module 502 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The hardware module 502 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the hardware module 502 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 502 can further read information from the storage device 518 by detecting the physical states or characteristics of one or more particular locations within the physical storage units.

In addition to the mass storage device 518 described above, the hardware module 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 502. In some examples, the operations performed by the distributed router system 400, and or any components included therein, may be supported by one or more devices similar to the hardware module 502. Stated otherwise, some or all of the operations performed by the distributed router system 400, and or any components included therein, may be performed by one or more hardware modules 500 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the hardware module 502. According to one embodiment, the operating system comprises the LINUX or NETBSD operating system and derivatives thereof. According to another embodiment, the operating system comprises the CISCO IOS operating system from CISCO SYSTEMS INC. of San Jose, Calif. It should be appreciated that other operating systems can also be utilized. The storage device 518 can store other system or application programs and data utilized by the hardware module 500.

In one embodiment, the storage device 518 or other computer-readable storage media is encoded with computer-executable instructions which, when loaded into the computer 402, transform the computer from a general-purpose computing system into a special-purpose computer capable of implementing the embodiments described herein. These computer-executable instructions transform the hardware module 500 by specifying how the CPUs 504 transition between states, as described above. According to one embodiment, the hardware module 500 has access to computer-readable storage media storing computer-executable instructions which, when executed by the hardware module 500, perform the various processes described above with regard to FIGS. 1-4. The hardware module 500 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A router processor module hosting a communication server, the router processor module comprising:
   one or more processors; and
   one or more non-transitory computer-readable media storing computer-executable instructions that, when executed by the one or more processors, cause the one or more processors to:
   receive a request message according to a client-server transaction protocol from a communication client hosted by a modular service card, the request message comprising a software image signature representing a network operating system (NOS) image version flashed onto the modular service card, the software image signature including information indicating respective states of a plurality of features of the NOS image version;
   forward the software image signature to an NOS verification server;
   receive an NOS compatibility verification result based on a comparison of whether a state of a compatibility-determining feature of the NOS image version, as indicated by the software image signature, matches a state of the same compatibility-determining feature of a determining NOS image version, from the NOS verification server; and
   send an acknowledgement message in response to the request message according to the client-server transaction protocol to the communication client, the acknowledgement message comprising an option instructing a boot sequence of the modular service card hosting the communication client.

2. The router processor module of claim 1, wherein the router processor module and the modular service card are in communication over one or more switch fabric planes established by a plurality of fabric card modules.

3. The router processor module of claim 1, wherein the client-server transaction protocol is Dynamic Host Configuration Protocol (DHCP).

4. The router processor module of claim 2, wherein the option instructing a boot sequence is specified by Preboot eXecution Environment (PXE) protocol.

5. The router processor module of claim 1, wherein the NOS verification server is hosted on the router processor module.

6. The router processor module of claim 1, wherein the NOS verification server is hosted on a second router processor module, and the router processor module and the second router processor module are in communication over one or more switch fabric planes established by a plurality of fabric card modules.

7. The router processor module of claim 1, wherein in the case that the NOS compatibility verification result indicates that the NOS image version represented by the NOS signature is compatible, the option of the acknowledgement message instructs the boot sequence of the modular service card to boot from an NOS image on local storage of the modular service card.

8. The router processor module of claim 1, wherein in the case that the NOS compatibility verification result indicates that the NOS image version represented by the NOS signature is incompatible, the acknowledgement message further comprises an NOS image file, and the option of the acknowledgement message instructs the boot sequence of the modular service card to boot from the NOS image file received over a network interface of the modular service card.

9. A method comprising:
receiving a request message according to a client-server transaction protocol from a communication client hosted by a modular service card, the request message comprising a software image signature representing a network operating system (NOS) image version flashed onto the modular service card, the software image signature including information indicating respective states of a plurality of features of the NOS image version;
forwarding the software image signature to an NOS verification server;
receiving an NOS compatibility verification result based on a comparison of whether a state of a compatibility-determining feature of the NOS image version, as indicated by the software image signature, matches a state of the same compatibility-determining feature of a determining NOS image version, from the NOS verification server; and
sending an acknowledgement message in response to the request message according to the client-server transaction protocol to the communication client, the acknowledgement message comprising an option instructing a boot sequence of the modular service card hosting the communication client.

10. The method of claim 9, wherein receiving the request message and sending the acknowledgment message are performed through a connection to the communication client over one or more switch fabric planes established by a plurality of fabric card modules.

11. The method of claim 9, wherein the client-server transaction protocol is Dynamic Host Configuration Protocol (DHCP).

12. The method of claim 11, wherein the option instructing a boot sequence is specified by Preboot eXecution Environment (PXE) protocol.

13. The method of claim 9, wherein in the case that the NOS compatibility verification result indicates that the NOS image version represented by the NOS signature is compatible, the option of the acknowledgement message instructs the boot sequence of the modular service card to boot from an NOS image on local storage of the modular service card.

14. The method of claim 9, further comprising, in the case that the NOS compatibility verification result indicates that the NOS image version represented by the NOS signature is incompatible, sending an NOS image file to the communication client, wherein the option of the acknowledgement message instructs the boot sequence of the modular service card to boot from the NOS image file received over a network interface of the modular service card.

15. A system comprising:
one or more router processor modules;
one or more modular service cards;
one or more processors; and
one or more non-transitory computer-readable media storing computer-executable instructions that, when executed by the one or more processors, cause the one or more processors to:

send, by a communication client hosted by a modular service card during a boot sequence of the modular service card, a request message according to a client-server transaction protocol to a communication server hosted by a router processor module, the request message comprising a software image signature representing a network operating system (NOS) image version flashed onto the modular service card, the software image signature including information indicating respective states of a plurality of features of the NOS image version;
receive, by the communication server, the request message;
forward, by the communication server, the software image signature to an NOS verification server;
receive, by the communication server, an NOS compatibility verification result based on a comparison of whether a state of a compatibility-determining feature of the NOS image version, as indicated by the software image signature, matches a state of the same compatibility-determining feature of a determining NOS image version, from the NOS verification server;
send, by the communication server, an acknowledgement message in response to the request message according to the client-server transaction protocol to the communication client, the acknowledgement message comprising an option instructing a boot sequence of the modular service card hosting the communication client;
receive, by the communication client, the acknowledgement message; and
boot, by the communication client, the modular service card according to the option.

16. The system of claim 15, wherein the system further comprises a plurality of fabric card modules; and
sending and receiving the request message and sending and receiving the acknowledgment message are performed through a connection between the communication client and the communication server over one or more switch fabric planes established by the plurality of fabric card modules.

17. The system of claim 15, wherein the client-server transaction protocol is Dynamic Host Configuration Protocol (DHCP).

18. The system of claim 17, wherein the option instructing a boot sequence is specified by Preboot eXecution Environment (PXE) protocol.

19. The system of claim 15, comprising further computer-executable instructions that, when executed by the one or more processors, cause the one or more processors to:
boot, by the communication client, the modular service card from an NOS image on local storage of the modular service card, in the case that the NOS compatibility verification result indicates that the NOS image version represented by the NOS signature is compatible.

20. The system of claim 15, comprising further computer-executable instructions that, when executed by the one or more processors, cause the one or more processors to:
boot, by the communication client, the modular service card from an NOS image file received over a network interface of the modular service card from the communication server, in the case that the NOS compatibility verification result indicates that the NOS image version represented by the NOS signature is incompatible.

* * * * *